Patented Dec. 19, 1939

2,183,957

UNITED STATES PATENT OFFICE 2,183,957

ART OF DESENSITIZING JUICES DERIVED FROM PLANTS OF THE CASHEW FAMILY

Martha Blanchard Cayo, Germantown, Pa., assignor to Durite Plastics, Incorporated, Philadelphia, Pa., a corporation of Pennsylvania No Drawing. Application October 23, 1937,
Serial No. 170,705

13 Claims. (Cl. 134—56)

This invention relates to the art of desensitizing the juices derived from certain plants of the cashew family.

The plants of the cashew family (Anacardiaceae) are characterized by the fact that they yield juices which are of acrid, caustic and resinous nature. The juices of certain of the plants of this family have found some application in the industries. Thus, the juices of the Japanese and Chinese varnish trees (Rhus vernicifera) have for centuries been used in the manufacture of varnishes and lacquers. More recently, the shell liquids of the cashew nut (Anacardium occidentale) and the marking nut (Anacardium orientale or Semacarpus anacardium) have been employed in the manufacture of printing inks, varnishes, lacquers and synthetic resins. The greatest drawback to the use of these materials, particularly in this country, is the fact that certain of the juices produce dermatitis or the "poison ivy" effect in persons who are not immune to this type of poisoning. In this connection, it may be stated that during the World War when Chinese lacquer was imported into this country for use on aeroplane propellers, it was found necessary to employ Chinese workmen to apply the lacquer due to the fact that western workers developed dermatitis.

An important object of the present invention is to provide a simple, relatively inexpensive method for desensitizing those juices and liquids derived from the plants of the cashew family which tend to produce dermatitis in persons who are not immune to this type of poisoning.

Another important object is to provide a method for greatly reducing or eliminating entirely the "poison ivy" effect which is characteristic of certain of the juices and liquids derived from plants of the cashew family.

Another important object is to provide a method for greatly reducing or eliminating entirely the "poison ivy" effect of the shell liquids of the cashew and marking nuts.

Another object is to provide a method for desensitizing the juices and liquids derived from certain plants of the cashew family without adversely affecting the properties which have rendered the untreated juices and liquids of said plants useful in industry.

Still another object is to provide a method for treating the juices and liquids of certain plants of the cashew family, which is susceptible of being carried out by unskilled labor on the plantation, thus decreasing to a minimum the industrial hazards in this country incident to the handling of these materials.

A further object is to provide a new class of compositions derived from the juices and liquids of certain plants of the cashew family which are substantially devoid of the tendency to produce dermatitis or the "poison ivy" effect in persons who are not immune to this type of poisoning, while possessing substantially all the properties which have rendered the juices and liquids useful in industry.

Briefly stated, the method of the invention in its broadest aspects consists in bringing the juices or liquids to be desensitized into intimate contact with a protein or a mixture of proteins or with certain derivatives of proteins.

The proteins may be either of animal or vegetable origin. Among the proteins which may be advantageously used in practicing the teachings of the present invention may be mentioned the protamines such as salmine and sturine, the histones such as globin, the albumins such as egg, serum, blood, leucosin, etc., the globulins such as fibrin, miosin and edestin, the prolamines such as gliadin and zein, and the scleroproteins such as keratin, fibroin and gelatine.

Because of their commercial availability at relatively low prices, many of the animal proteins such as those obtained from egg, blood, hides, bone and horn and many of the vegetable proteins such as those obtained from corn, maize, wheat, peas and soya bean are particularly well suited for use in practicing this invention.

The protein may be either in flaked or finely divided form. In the case of certain proteins such as gelatine, it may be in sheet form. In the case of proteins such as soya bean, the protein may be in the form of broken or ground press cake, the ground form being preferable because it affords maximum surface for contact with the juices or liquids to be treated.

A very simple procedure is to add the protein or mixture of proteins in dry form to the juices or liquids to be desensitized, stir the mixture to insure intimate contact, allow the mixture to stand over night at room temperature and finally strain off the residues.

The following is given as a typical example of the foregoing procedure:

Dried blood albumin is added and stirred in with cashew nut shell liquid in the proportion of 2 grams of albumin to each 30 cubic centimeters of shell liquid. The mixture is allowed to stand over night at room temperature, and the residues are finally strained off.

The following is given as another example of the foregoing procedure:

A protein such as hide glue, bone glue, gelatine, dried blood or isinglass or a mixture of these proteins is added to cashew nut shell liquid in the proportion of eight ounces of protein substance to each gallon of shell liquid, and the mixture is constantly stirred for a sufficient period of time to produce thorough and intimate contact between the ingredients of the mixture. Several hours are generally considered sufficient for this purpose. The residues are finally strained off as in the foregoing example.

The foregoing illustrative methods result in a substantial desensitization which is sufficient for many practical purposes. The degree of desensitization can be improved by repeating the process using another quantity of the same or a different protein or by heating the mixture of protein and liquid being desensitized.

A variation of the foregoing procedure consists in first swelling the protein before it is added to the liquid to be desensitized. The swelling may be produced by means of water, an aqueous solution of a salt such as sodium chloride or potassium chloride, an aqueous or alcoholic solution of an alkali such as caustic soda or potash or an aqueous solution of an acid such as hydrochloric or sulphuric. The salt solution appears to improve the colloidal and osmotic properties of the protein. A very small amount of salt is generally sufficient for the purpose. The salt may be in the proportion of 1% on the amount of the protein. The acid or alkali appears to have the effect of hydrolizing a portion of the protein to proteoses, peptones and amino acids which apparently are effective desensitizers of the juices and liquids of the plants of the cashew family.

The swelling agent may be added to the protein in various ways. A very simple way is merely to spray or moisten the protein with the swelling agent. Another way is to mix the protein with the swelling agent, allow the mixture to stand until a desired amount of swelling or softening has occurred and then to drain off the swelling agent. Finally the swelled or softened protein is mixed with the liquids to be desensitized.

As in the case where the dry protein is used, the desensitization with the swelled or softened protein may be carried out at or above room temperature. As a general rule, it may be stated that the higher the temperature the better the result. The optimum result appears to be obtained by heating the mixture to between 400° and 600° F. It is to be particularly noted that heating of the mixture to between 350° and 400° F. disintegrates or disorganizes the proteins, rendering it unnecessary to strain off the residues. Hence, for most practical purposes, it is not necessary to heat the mixture above 400° F. It has been found advantageous to allow the mixture before heating to stand for some time at room temperature, preferably while the mixture is being stirred to produce maximum contact between the ingredients of the mixture.

The following is an illustrative procedure using a swelling agent:

A protein such as gelatine is added to a 10% aqueous solution of sodium hydroxide in the ratio of four grams of protein to each ten cubic centimeters of solution. After about thirty minutes the excess alkali is drained off, and the softened protein is stirred in with cashew nut shell liquid in the ratio of thirty cubic centimeters of shell liquid to the four grams of dry protein.

The foregoing mixture may be allowed to stand overnight, after which the residues of protein are strained off. A variation is to heat the mixture slowly to 215° F. in one hour and then gradually to 325° F. in three hours after which the residues are strained off. The temperature may be raised above 350° F. in which case it will not be necessary to strain off the residues.

As has been stated, acids and alkalies appear to hydrolize the proteins which are used for desensitization. Substantially the same result may be obtained by mixing the protein with a proteolytic enzyme such as pepsin, trypsin and erepsin. In any event, the protein may first be mixed with the hydrolizing agent and the hydrolized or partially hydrolized protein added to the juices or liquids to be desensitized, or the protein and hydrolizing agent may be added either simultaneously or consecutively to the juices or liquids.

A very simple procedure employing a hydrolizing agent is to mix the juices or liquids to be desensitized with a protein and the hydrolizing agent, stir the mixture to produce intimate contact and allow it to stand overnight at room temperature. Heating above room temperature may be resorted to, but the heat should be applied gradually and should not be so high as to cause charring of the juices being treated. A final temperature of about 260° F. gives a very good result, but the optimum desensitization is obtainable above this temperature, particularly in the range of 400° to 600° F. As has been stated heating above 350° F. renders it unnecessary to strain off the residues. It has been found advantageous to allow the mixture to stand awhile before applying the heat.

The following is given as a typical example of the foregoing procedure.

Eight ounces of gelatin, one fluid ounce of hydrochloric acid (10%) and common salt (1/30 of an ounce) are added to one gallon of cashew nut shell liquid, the mixture is well stirred and is permitted to stand over night at or above room temperature.

The method of the foregoing example is sufficient to desensitize the shell liquid to a high degree. The result can be improved considerably by adding one ounce of dried blood or blood albumin to the mixture or heating the mixture.

Instead of using hydrolized or partially hydrolized protein, I have found it possible to employ the free amino acids in which the amino group is alpha to the carboxyl group. These amino acids are formed by the hydrolysis of proteins.

As examples of suitable amino acids may be mentioned alanine (alpha-aminopropionic acid), arginine, aspartic acid (aminosuccinic acid), cystine, glutamic acid (alpha-aminoglutaric acid), glycine (aminoacetic acid), histidine, hydroxyproline, leucine, lysine, methionine, phenylalanine, proline, serine, tryptophane, tyrosine and valine.

The amino acid or mixture of amino acids is added directly to the juices or liquids to be desensitized. The result is substantially the same as when a mixture of a protein and a hydrolizing agent is added to the juices or liquids. For, the hydrolysis of proteins results in the formation of amino acids. The treatment may be carried out at or above room temperature as in the cases where proteins alone or in the presence of hydrolizing agents are used. In any event I consider it advantageous to stir the mixture of the juices or liquids and amino acids well to bring about thorough intermixing between the ingredients. It is preferable to allow the mixture to stand a few hours with intermittent or constant stirring.

The treatment of the juices and liquids of the plants of the cashew family in accordance with the teachings of the present invention does not adversely affect the properties which have rendered the untreated juices of certain of said plants useful in industry. Hence, it follows that the desensitized substances may be used for the same purposes without, however, the industrial hazards due to the "poison ivy" effect of the untreated juices. Among the many possible applications of the desensitized juices, particularly those derived from the shells of the cashew and marking nuts may be mentioned the manufacture of inks, coatings, paints, varnishes, lacquers, preservatives, impregnating agents, adhesives, cements, lutes, molding compositions, synthetic resins, etc.

The desensitizing treatment may advantageously be carried out on the plantations with native labor. Hence, the present invention affords a practical means for greatly reducing the industrial hazards incident to the handling of the juices and liquids of the plants of the cashew family.

The invention in its specific aspects has been described with particular reference to the treatment of cashew nut shell liquid, for not only is this one of the most promising applications of the invention, but it also lends itself admirably for the specific disclosure of the invention such as is required by the patent statutes. Hence, although the invention has been described with considerable detail and particularity and certain specific terms and language have been utilized, it is to be distinctly understood that the foregoing disclosure is illustrative, rather than restrictive and that no limitations are to be imported which are not required by the language of the claims and the state of the prior art.

I claim:

1. The method of desensitizing the juices or liquids of the cashew family such as the shell liquid of the cashew nut, which consists in mixing the juices or liquids to be desensitized with a protein selected from the group consisting of egg and blood albumin, fibroin, keratin and gelatine, allowing the mixture to stand for a time sufficient to produce substantial desensitization and finally removing the residues of the protein from the mixture.

2. The method of desensitizing the juices or liquids of the cashew family such as the shell liquid of the cashew nut, which consists in mixing the juices or liquids to be desensitized with a protein selected from the group consisting of egg and blood albumin, fibroin, keratin and gelatine, and heating the mixture to between 400° and 600° F. disintegrate the protein and to produce optimum desensitization.

3. The method of desensitizing the juices or liquids of the cashew family such as the shell liquid of the cashew nut, which consists in mixing the juices or liquids to be desensitized with a protein in the ratio of eight ounces of protein to one gallon of shell liquid, stirring the mixture to produce a thorough and intimate contact between the ingredients, and finally removing the residues of the protein from the mixture.

4. The method of desensitizing the juices or liquids of the cashew family such as the shell liquid of the cashew nut, which consists in bringing the juices or liquids to be desensitized into intimate contact with a protein which has been moistened with a hydrolizing agent for the protein.

5. The method of desensitizing the juices or liquids of the cashew family such as the shell liquid of the cashew nut, which consists in mixing the juices or liquids to be desensitized with aminoacetic acid.

6. The method of desensitizing the juices or liquids of the cashew family such as the shell liquid of the cashew nut, which consists in bringing the juices or liquids to be desensitized into intimate contact with a vegetable protein, allowing the mixture to stand for a time sufficient to produce substantial desensitization and finally removing the residues of the protein from the mixture.

7. The method of desensitizing the juices or liquids of the cashew family such as the shell liquid of the cashew nut, which consists in mixing the juices or liquids to be desensitized with a vegetable protein, and heating the mixture to between 400° and 600° F. to disintegrate the vegetable protein and to produce optimum desensitization.

8. The method of desensitizing the juices or liquids of the cashew family such as the shell liquid of the cashew nut, which consists in mixing the juices or liquids to be desensitized with an amino acid selected from the group consisting of alanine (alpha-aminopropionic acid), arginine, aspartic acid (amino-succinic acid), cystine, glutamic acid (alpha-aminoglutaric acid), glycine (aminoacetic acid), histidine, hydroxyproline, leucine, lysine, methione, phenylalanine, proline, serine, tryptophane, tyrosine and valine.

9. The method of desensitizing the juices or liquids of the cashew family such as the shell liquid of the cashew nut, which consists in mixing the juices or liquids to be desensitized with an amino acid derived from a protein by hydrolysis.

10. The method of desensitizing the juices or liquids of the cashew family such as the shell liquid of the cashew nut, which consists in bringing the juices or liquids to be desensitized into intimate contact with a protein which has been swelled with a substance selected from the group consisting of water, a solution of a salt, a solution of an acid and a solution of an alkali.

11. The method of desensitizing the juices or liquids of the cashew family such as the shell liquid of the cashew nut, which consists in bringing the juices or liquids to be desensitized into intimate contact with a protein which has been swelled in an aqueous medium.

12. As a composition of matter, the reaction product of the juices or liquids of the plants of the cashew family with a relatively small quantity of a protein which has been moistened with a hydrolizing agent for the protein, said reaction product being substantially devoid of the tendency to produce dermatitis.

13. As a composition of matter, the reaction product of the juices or liquids of the plants of the cashew family with amino-acetic acid, said reaction product being substantially devoid of the tendency to produce dermatitis.

MARTHA BLANCHARD CAYO.